(12) United States Patent
Lee

(10) Patent No.: US 11,598,414 B2
(45) Date of Patent: Mar. 7, 2023

(54) METHOD OF AND SYSTEM FOR CONTROLLING GEAR SHIFTING IN RESPONSE TO CHANGE OF DRIVING MODE

(71) Applicant: HYUNDAI KEFICO CORPORATION, Gyeonggi-do (KR)

(72) Inventor: Hyeong-Tak Lee, Seoul (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 17/717,940

(22) Filed: Apr. 11, 2022

(65) Prior Publication Data

US 2022/0325789 A1 Oct. 13, 2022

(30) Foreign Application Priority Data

Apr. 12, 2021 (KR) .......................... 10-2021-0047283

(51) Int. Cl.
*F16H 59/18* (2006.01)
*F16H 61/04* (2006.01)
(Continued)

(52) U.S. Cl.
CPC ............. *F16H 61/04* (2013.01); *F16H 59/18* (2013.01); *F16H 59/40* (2013.01); *F16H 59/44* (2013.01);
(Continued)

(58) Field of Classification Search
CPC .......... F16H 59/18; F16H 59/40; F16H 59/44; F16H 59/70; F16H 59/74; F16H 59/20;
(Continued)

(56) References Cited

U.S. PATENT DOCUMENTS 7,274,983 B1 * 9/2007 Kim ..................... F16H 61/0213
701/55
2016/0214614 A1 * 7/2016 Shirasaki .............. B60W 10/06
(Continued)

FOREIGN PATENT DOCUMENTS

JP 2002-243031 A 8/2002
KR 1996-0066464 12/1996
(Continued)

OTHER PUBLICATIONS

Notice of Allowance dated Jan. 2, 2023 in Korean Application No. 10-2021-0047283.

*Primary Examiner* — Edwin A Young
(74) *Attorney, Agent, or Firm* — Fox Rothschild LLP

(57) ABSTRACT

In one aspect, a method of controlling gear shifting in response to a driving mode change, the method including determining a maximum number of allowable low-level gear-shifting steps according to a result of determining a state of a transmission, computing an immediate post-gear-shifting expected speed of a turbine for each step included that is within the maximum number of allowable low-level gear-shifting steps, using a current speed of an output shaft of the transmission and a gear ratio of each step and comparing the computed expected speed of the turbine with a preset allowable speed thereof for each step, setting the lowest-level gear-shifting step, among gear-shifting steps at which the expected speed of the turbine and the allowable speed thereof satisfy a predetermined condition, is set to be a target gear-shifting step, and executing gear-shifting control for shifting a current gear-shifting step down to the target gear-shifting step.

19 Claims, 4 Drawing Sheets

(51) Int. Cl.
*F16H 59/40* (2006.01)
*F16H 59/74* (2006.01)
*F16H 61/16* (2006.01)
*F16H 59/44* (2006.01)
*F16H 59/70* (2006.01)
*F16H 59/36* (2006.01)

(52) U.S. Cl.
CPC ............. *F16H 59/70* (2013.01); *F16H 59/74* (2013.01); *F16H 61/16* (2013.01); *F16H 2059/366* (2013.01)

(58) Field of Classification Search
CPC .... F16H 61/04; F16H 61/16; F16H 2059/366; F16H 2059/0221; F16H 2061/022
See application file for complete search history.

(56) References Cited

U.S. PATENT DOCUMENTS

| | | | | |
|---|---|---|---|---|
| 2018/0216727 A1* | 8/2018 | Sakai | .................. | F16H 61/0213 |
| 2018/0229734 A1* | 8/2018 | Tsukamoto | ........... | F16H 63/502 |

FOREIGN PATENT DOCUMENTS

| KR | 1999-0027525 | 7/1999 |
|---|---|---|
| KR | 10-0279473 B1 | 3/2001 |
| KR | 100279472 B1 | 3/2001 |
| KR | 10-0836914 B1 | 6/2008 |
| KR | 10-2014-0085143 A | 7/2014 |
| KR | 10-2018-0071455 A | 6/2018 |

\* cited by examiner

STATE OF TRANSMISSION --> TRANSMISSION IS POWERED ON
(OUTPUT OF APS > SETTING VALUE) & CURRENT GEAR-SHIFTING
STEP: FIFTH STEP

| GEAR-SHIFTING STEP | RATIO OF GEAR | CURRENT SPEED OF OUTPUT SHAFT (rpm) | EXPECTED SPEED OF TURBINE rpm | ALLOWABLE SPEED OF TURBINE (SETTING VALUE) |
|---|---|---|---|---|
| 1 | 3:1 | 2000 | 6000 | 5000 |
| 2 | 2:1 | 3000 | 4000 | 4500 |
| 3 | 1:1 | 3000 | 3000 | 4500 |
| 4 | 1:2 | 2000 | 1000 | 3000 |

FIG. 2

METHOD OF AND SYSTEM FOR CONTROLLING GEAR SHIFTING IN RESPONSE TO CHANGE OF DRIVING MODE

CROSS REFERENCE TO RELATED APPLICATION

The present application claims priority to Korean Patent Application No. 10-2021-0047283, filed Apr. 12, 2021, the entire contents of which is incorporated herein for all purposes by this reference.

BACKGROUND

Field

The present disclosure relates to a method and a system for controlling gear shifting in response to a change of a driving mode and, more particularly, to a method and a system for controlling gear shifting in response to a change of a driving mode, the method and the system being capable of controlling gear shifting in a case where switching from an operating mode (for example, an ECO mode, a normal mode, a comfort mode, or the like) other than a sports mode to the sports mode takes place during traveling, and an automatic transmission vehicle including the system for controlling gear shifting in response to a change of a driving mode.

Background

Usually, an automatic transmission is a mechanic apparatus capable of automatically obtaining a result of optimal torque conversion in accordance with a traveling speed of a vehicle and a load. The automatic transmission is configured in such a manner that gears are shifted by operating a gear-shifting solenoid and a clutch under the control of a transmission control unit (TCU) that outputs a gear-shifting control command at the request of a driver or on the basis of a traveling state of the vehicle.

The transmission control unit (TCU) controlling the automatic transmission receives information on a state of the vehicle from an engine control unit (ECU) and outputs a control command for controlling the gear-shifting solenoid and the clutch in order to perform gear shifting on the basis of the received information. In addition, the transmission control unit makes a request to the engine control unit for an output change at a point in time for gear shifting according to operations of the gear-shifting solenoid and the clutch.

For example, when the driver presses an acceleration pedal in order to accelerate the vehicle, the transmission control unit makes a request to the engine control unit for reduction of engine torque in order to perform a smooth gear-shifting operation for up-shifting or down-shifting. Then, a request for increasing the engine torque is output to the engine control unit after the request for the reduction of the engine torque is made in order to synchronize a rotation speed of an input shaft of the automatic transmission and a rotation speed of an output shaft of an engine.

The gear-shifting control unit also determines an optimal gear-shifting step suitable for an amount of work on an acceleration pedal and for a speed of the traveling vehicle, using a gear-shifting pattern (a gear-shifting map) that is set from a relationship between the amount of work on the acceleration pedal and an output speed of the transmission, that is, a vehicle speed. Then, the optimal gear-shifting step is set to be a target gear-shifting step, and a target hydraulic pressure (a solenoid duty value) for gear-shifting to the target gear-shifting step is determined. The gear-shifting solenoid is controlled on the basis of the target hydraulic pressure.

The automatic transmission vehicle meeting predetermined specifications has a function of selecting a driving mode. The drive can select a desired driving mode through a dedicated switch mounted on a suitable place within the vehicle having the function of selecting a driving mode. When the driving mode is selected, a gear-shifting pattern matched with the selected driving mode is fetched, and gear shifting is accordingly realized in accordance with the gear-shifting pattern. Thus, increased vehicle responsiveness and a different feeling of gear shifting can be obtained according to the driver's preference.

Usually, selectable driving modes include an ECO mode, a normal mode, a comfort mode, a sports mode, and the like, depending on types of vehicles. Among these modes, the sports mode is a mode in which a reference point for gear shifting is set to be positioned for a higher speed than in the other modes. Gear shifting to a high-level step is performed at the expense of fuel efficiency in a state where the vehicle gains sufficient driving force. Thus, the driver can enjoy more dynamic driving and can feel increased vehicle responsiveness.

However, when a change of the driving mode to the sports mode takes place during traveling, gear shifting is performed uniformly in accordance with a gear-shifting reference point that is set to be in the sports mode-dedicated gear-shifting pattern (a sports mode-dedicated gear-shifting map that has factors: a vehicle speed and an amount of work on a pedal.

The foregoing is intended merely to aid in the understanding of the background of the present disclosure, and is not intended to mean that the present disclosure falls within the purview of the related art that is already known to those skilled in the art.

SUMMARY

In one aspect, a method and a system are now provided for controlling gear shifting in response to a change of a driving mode, the method and the system being capable of performing down-shifting by setting a target gear-shifting step to a low-level step that is lower than a gear-shifting step that is set to be a sports mode-dedicated gear-shifting pattern (a gear-shifting map) when a change from a driving mode other than a sports mode to the sports mode takes place during traveling. A driver's desire to enjoy dynamic driving can be satisfied.

In one aspect, there is provided a method of controlling gear shifting in response to a change of a driving mode, the method comprising: (a) determining a maximum number of allowable low-level gear-shifting steps according to a result of determining a state of a transmission on the basis of information on an acceleration pedal operation (a signal of an APS) when a request for a change of a driving mode to a sports mode is detected during traveling; (b) computing an immediate post-gear-shifting expected speed of a turbine for each step that is included within the maximum number of allowable low-level gear-shifting steps, using a current speed of an output shaft of the transmission and a gear ratio of each step and comparing the computed expected speed of the turbine (a speed of an input shaft of the transmission) with a preset allowable speed of the turbine for each step; (c) setting the lowest-level gear-shifting step, among gear-shifting steps at which the expected speed of the turbine and the allowable speed of the turbine satisfy a predetermined condition, is set to be a target gear-shifting step, within the maximum number of allowable low-level gear-shifting steps; and (d) executing gear-shifting control for shifting a current gear-shifting step down to the target gear-shifting step.

The "expected speed of the turbine" here means a value obtained by expecting the speed of the input shaft of the transmission that is connected directly to the turbine, as a speed expected value of a torque converter turbine arranged between an engine and a transmission. This value may be derived from a simple equation in which the current speed of the output shaft of the transmission (a vehicle speed) is multiplied by the reciprocal of a gear ratio of the target gear-shifting step.

The term "allowable speed of the turbine", one of the terms used to describe an embodiment of the present disclosure, means an allowable speed of the input shaft of the transmission. The allowable speed of the turbine means a maximum value of a rotational speed of the input shaft of the transmission at which motive power of an engine can be stably output by gear shifting without sacrificing a load-bearing capacity for each gear-shifting step. The allowable speed of the turbine is a fixed value to be set in a recording device, such as a memory, in such a manner as to vary with the gear-shifting step (because a gear ratio varies with the gear-shifting step).

In a preferred aspect, in (a) the determining of the maximum number of allowable low-level gear-shifting steps, when an output of an APS is at or above a setting value at a point in time when the request for the change of the driving mode is detected, it may be determined that the transmission is in a powered-on state, and when the output of the APS is below the setting value, it may be determined that the transmission is in a powered-off state.

In a preferred aspect, when the transmission is in the powered-on state, the number of low-level gear-shifting steps that are lower than a setting gear-shifting step determined through a sports mode-dedicated gear-shifting pattern may be determined as the maximum number of allowable low-level gear-shifting steps, and when the transmission is in the powered-off state, the maximum number of allowable low-level gear-shifting steps may be determined as 1 in such a manner as to allow for low-level gear shifting to only a low-level gear-shifting step (a setting gear-shifting step number minus 1) that is one step lower than the setting gear-shifting step determined through the sports mode-dedicated gear-shifting pattern.

In a further preferred aspect, in the method, in (b) the computing of the immediate post-gear-shifting expected speed of the turbine, the immediate post-gear-shifting expected speed of the turbine for each step may be at a value (the current speed of the output shaft of the transmission/the gear ratio of each step) that results from dividing the current speed of the output shaft of the transmission by the gear ratio of each step.

In a further preferred aspect, in the method, in (c) the setting of the lowest-level gear-shifting step, the predetermined condition may be that the expected speed of the turbine does not exceed the allowable speed of the turbine.

In certain preferred aspects, the method may further include: (e) comparing the time (a gear-shifting control time) taken for the gear-shifting control for shifting the current gear-shifting step down to the target gear-shifting step in (d) the executing of the gear-shifting control, with a preset setting gear-shifting control time.

In preferred aspects, in the method, when the gear-shifting control time exceeds the setting gear-shifting control time, a process may be ended in such a state without further executing the gear-shifting control, and when the gear-shifting control time is shorter than the setting gear-shifting control time, it may be determined whether or not gear shifting to the target gear-shifting step is completed, and when the gear shifting is completed within the setting gear-shifting control time, the process may be ended.

In preferred aspects, in the method, in a case where the gear-shifting control time is shorter than the setting gear-shifting control time and where the gear shifting to the target gear-shifting step is not completed, returning to (d) the executing of the gear-shifting control, and (d) the executing of the gear-shifting control and (e) the comparing of the time taken for the gear-shifting control may be repeatedly performed.

In certain preferred aspects, the method may further include (f) executing control for constricting gear shifting toward a high-level gear-shifting step after the gear shifting to the target gear-shifting step is completed.

In certain preferred aspects, in the method, (f) the executing of the control for constricting the gear shifting include: (f-1) making a request for preventing of the gear shifting to the high-level gear-shifting step in order to constrict the gear shifting to the high-level gear-shifting step after the gear shifting to the target gear-shifting is completed; and (f-2) comparing the current gear-shifting step (a gear-shifting step corresponding to the target gear-shifting step) with a setting gear-shifting step determined through a sports mode-dedicated gear-shifting pattern according to a current output of the APS and a current vehicle speed and determining according to a result of the comparison whether the preventing of the gear shifting to the high-level gear-shifting step is canceled or maintained.

In certain preferred aspects, in the method, (f-2) the comparing of the current gear-shifting step with the setting gear-shifting step may include: (f-2-1) canceling immediately the preventing of the gear shifting to the high-level gear-shifting step because control for the preventing of the gear shifting to the high-level gear-shifting step is unnecessary when the current gear-shifting step (the gear-shifting step corresponding to the target gear-shifting step) is equal to the setting gear-shifting step or is the high-level gear-shifting step; and (f-2-2) maintaining the preventing of the gear shifting to the high-level gear-shifting step when the current gear-shifting step (the gear shifting step corresponding to the target gear-shifting step) is a gear-shifting step lower than the setting gear-shifting step, and determining a point in time when the preventing of the gear shifting to the high-level gear-shifting step is canceled, by utilizing additional information.

In certain preferred aspects, in the method, in (f-2-2) the maintaining of the preventing of the gear shifting, a current engine speed may be compared with a preset allowable engine speed in order to prevent engine overrun; when the current engine speed is higher than the allowable engine speed, forced gear shifting to a high-level gear-shifting step that is one step higher than the current gear-shifting step may be performed and then the resulting high-level gear-shifting step may be compared with the setting gear-shifting step determined through the sports mode-dedicated gear-shifting pattern according to the current output of the APS and the current vehicle speed; and when the high-level gear-shifting step that is one step higher is higher than the setting gear-shifting step, the preventing of the gear shifting to the high-level gear-shifting step may be canceled.

In certain preferred aspects, in the method, in (f-2-2) the maintaining of the preventing of the gear shifting, when the current engine speed is lower than the allowable engine speed, on the basis of an output of the APS and the time for which the output thereof continues to be provided, it may be determined whether or not a driver has the intention to experience acceleration; when the output of the APS continues to be provided in a state of being at or above the setting value for a setting time or longer, it may be determined that the driver actually has the intention to experience acceleration, thus a timer may be operated and, at the same time, an increase in the vehicle speed that is obtained after a point in time when the gear shifting to the current gear-shifting step is completed may be compared with a preset reference value for the increase in the vehicle speed; when the increase in the vehicle speed is at or above the reference value for the increase in the vehicle speed, this situation may be recognized as an increase in the vehicle speed due to a slope of a road, rather than the intention to experience acceleration, and thus the forced gear shifting to a high-level gear-shifting step that is one step higher than the current gear-shifting step may be immediately performed; and thereafter, the resulting high-level gear-shifting step may be compared with the setting gear-shifting step determined through the sports mode-dedicated gear-shifting pattern according to the current output of the APS and the current vehicle speed and when the high-level gear-shifting step that is one step higher is higher than the setting gear-shifting step, the preventing of the gear-shifting to the high-level gear-shifting step may be canceled.

In certain preferred aspects, in the method, as a result of comparing the increase in the vehicle speed that is obtained after the point in time when the gear shifting is completed with the reference value for the increase in the vehicle speed, when the increase in the vehicle speed is below the reference value for the increase in the vehicle speed, a value of the time for which the timer is operated may be compared with a preset time reference value, and at a point in time when the time value is higher than the time reference value, the forced gear shifting to a high-level gear-shifting step that is one step higher than the current gear-shifting step may be performed; and thereafter, the resulting high-level gear-shifting step may be compared with the setting gear-shifting step determined through the sports mode-dedicated gear-shifting pattern according to the current output of the APS and the current vehicle speed, and when the high-level gear-shifting step that is one step higher is higher than the setting gear-shifting step, the preventing of the gear shifting to the high-level gear-shifting step may be canceled.

In certain preferred aspects, in the method, the forced gear shifting to a high-level gear-shifting step that is one step higher than the current gear-shifting step (the gear-shifting step corresponding to the target gear-shifting step) may be performed, and then the resulting high-level gear-shifting step may be compared with the setting gear-shifting step determined through the sports mode-dedicated gear-shifting pattern according to the current output of the APS and the current vehicle speed; as a result of the comparison, when the high-level gear-shifting level that is one step higher is lower than the setting gear-shifting step, the forced gear shifting to a high-level gear-shifting step that is one step higher may be performed; and thereafter, returning to the comparing of the resulting high-level gear-shifting step with the setting gear-shifting step may take place, and the comparing of the resulting high-level gear-shifting step and an operation subsequent thereto may be repeatedly performed.

One or more the above steps may be carried out through use of a processor or control unit.

According to another aspect of the present disclosure, there is provided a system for controlling gear shifting in response to a change of a driving mode, the system including: a mode change switch for a change of a driving mode; an accelerator position sensor (APS) configured to detect operation of an accelerator pedal by a driver and to output a corresponding signal; a vehicle speed detector configured to detect a speed of an output shaft of a transmission; and a transmission control unit (TCU) configured to control the transmission on the basis of information provided from the mode change switch, the APS, and the vehicle speed detector; wherein when a change from a driving mode other than a sports mode to the sports mode is detected during traveling, the transmission control unit executes control for downshifting to a low-level gear-shifting step that is one step lower than a setting gear-shifting step determined through a sports mode-dedicated gear-shifting pattern.

In certain preferred aspects, In the system, the transmission control unit may include: a gear-shifting mode change recognition unit configured to receive information on driving mode change from the mode change switch and to fetch a gear-shifting pattern matched with a driving mode, a change to which takes place; a number of low-level gear-shifting steps determination unit configured to determine a maximum number of allowable low-level gear-shifting steps according to a result of determining a state of the transmission on the basis of information on an acceleration pedal operation (a signal of an APS) when the gear-shifting mode change recognition unit recognizes the change of the driving mode to the sports mode during the traveling; a turbine expected-speed computation unit configured to compute an immediate post-gear-shifting expected speed of a turbine (a speed of an input shaft of the transmission) for each step that is included within the maximum number of allowable low-level gear-shifting steps, using a current speed of an output shaft of the transmission and a gear ratio of each step; a target gear-shifting step determination unit configured to set the lowest-level gear-shifting step, among gear-shifting steps at which the computed expected speed of the turbine for each step that is included within the maximum number of allowable low-level gear-shifting steps and a preset allowable speed of the turbine for each step satisfy a predetermined condition, to be a target gear-shifting step; and a transmission controller configured to execute gear-shifting control for shifting a gear-shifting step down to the target gear-shifting step.

In certain preferred aspects, in the system, when an output of the APS is at or above a setting value at a point in time when a request for the change of the driving mode is detected, the number of low-level gear-shifting steps determination unit may determine that the transmission is in a powered-on state and may determine as a maximum number of allowable low-level gear-shifting steps the number of low-level gear-shifting steps that are lower than the setting gear-shifting step determined through the sports mode-dedicated gear-shifting pattern; and when the output of the APS is below the setting value, the number of low-level gear-shifting steps determination unit may determine that the transmission is in a powered-off state, and may determine the maximum number of allowable low-level gear-shifting steps as 1 in such a manner as to allow for low-level gear shifting to only a low-level gear-shifting step (a setting gear-shifting step number minus 1) that is one step lower than the setting gear-shifting step determined through the sports mode-dedicated gear-shifting pattern.

In certain preferred aspects, in the system, the turbine expected-speed computation unit may compute the immediate post-gear-shifting expected speed of the turbine for each step by dividing the current speed of the output shaft of the transmission, which is detected by the vehicle speed detector, by the gear ratio of each step (the current speed of the output shaft of the transmission/the gear ratio of each step).

In certain preferred aspects, in the system, the predetermined condition may be a condition that the expected speed of the turbine does not exceed the allowable speed of the turbine.

In certain preferred aspects, in the system, the transmission control unit may further include a control time comparison unit configured to count the time (a gear-shifting control time) taken for the gear-shifting control for shifting a current gear-shifting step down to the target gear-shifting step and to compare the counted gear-shifting control time with a preset setting gear-shifting control time, wherein when the gear-shifting control time exceeds the setting gear-shifting control time, the control time comparison unit may make a request to the transmission controller for preventing of the gear-shifting control.

In certain preferred aspects, in the system, the transmission control unit may include a gear-shifting prevention request unit configured to make a request to the transmission controller for preventing of gear shifting to a high-level gear-shifting step for constricting the gear shifting toward the high-level gear-shifting step after the gear shifting to the target gear-shifting step is completed.

According to an embodiment of the present disclosure, when switching from a driving mode other than the sports mode to the sports mode takes place during the traveling, the target gear-shifting step is set to be a step that is lower than the gear-shifting step that is set to be in the sports mode-dedicated gear-shifting pattern (the gear-shifting map) (the gear shifting up to the lowest-level gear-shifting step is allowed on the basis of the allowable speed of the turbine for each step. Thus, the driver can enjoy dynamic driving.

Other aspects are disclosed infra.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is a table that describes a process of setting a target gear-shifting step;

DETAILED DESCRIPTION

Figure 1:
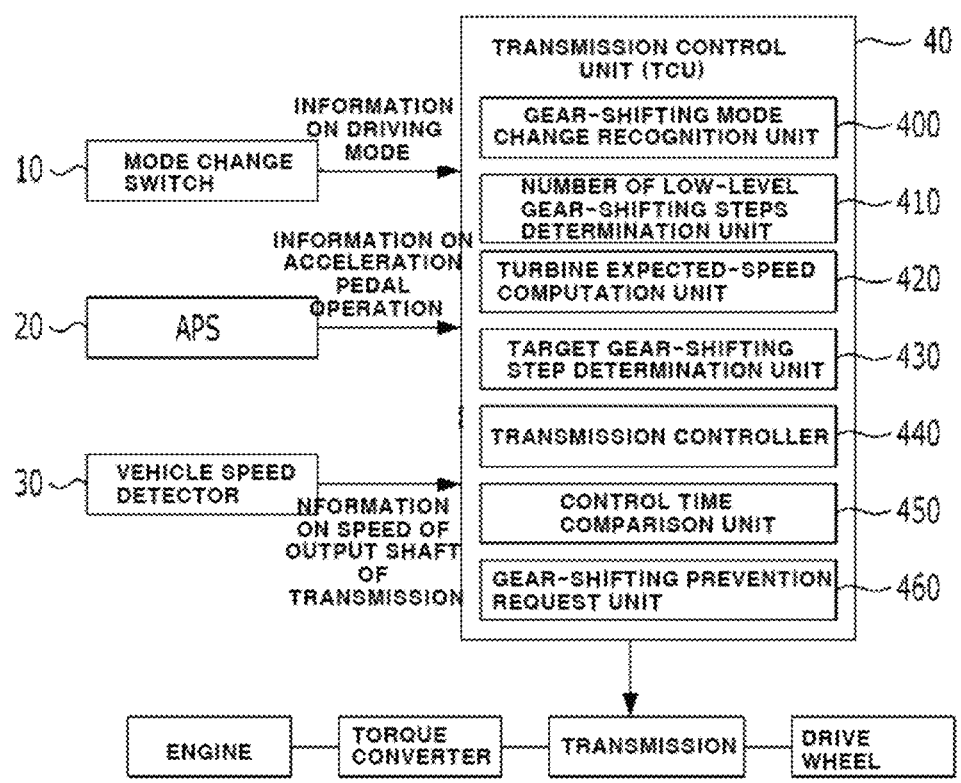
FIG. 1 is a schematic view illustrating a configuration of an automatic transmission vehicle including a gear-shifting control system responding to a change of a driving mode according to an embodiment of the present disclosure.

A preferred embodiment of the present disclosure will be described in detail below with reference to the drawings.

The terms used throughout the present specification are only for describing the preferred embodiment and are not intended to impose any limitation on the present disclosure. A noun in singular form has the same meaning as when used in plural form, unless it has a different meaning in context.

In addition, the term "include", "have", or the like in the present application is intended to indicate that a feature, a number, a step, an operation, a constituent element, a component, or a combination of these, which is described in the specification, is present. Therefore, it should be understood that the term does not negate in advance the likelihood that one or more other features, numbers, steps, operations, constituent elements, components, or combinations of these will be present and added.

In addition, the terms first, second, and so on are used to describe various constituent elements, but should not impose any limitation on the meanings of the constituent elements. These terms are used only to distinguish one element from another.

In addition, the term "unit", "module", or the like, which is used throughout the specification, means an individual component that performs at least one function or operation and may be realized in hardware, software, or a combination of both.

Further, control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

Like constituent elements are given like reference numerals, and redundant descriptions thereof are avoided. In this manner, the preferred embodiment of the present disclosure described with reference to the accompanying drawings. A detailed description of a technology known in the related art will be omitted when determined to obfuscate the gist of the present disclosure unapparent.

The primary terms used to describe a preferred embodiment of the present disclosure has the following meanings.

The term "expected speed of a turbine", one of the terms used to describe the embodiment of the present disclosure, means a value obtained by expecting a speed of an input shaft of a transmission that is connected directly to the turbine, as a speed expected value of a torque converter turbine arranged between an engine and a transmission. This value may be derived from a simple equation in which a current speed of an output shaft of the transmission (a vehicle speed) is multiplied by the reciprocal of a gear ratio of a target gear-shifting step.

The term "allowable speed of the turbine", one of the terms used to describe the embodiment of the present disclosure, means an allowable speed of the input shaft of the transmission. The allowable speed of the turbine means a maximum value of a rotational speed of the input shaft of the transmission at which motive power of an engine can be stably output by gear shifting without sacrificing a load-bearing capacity for each gear-shifting step. The allowable speed of the turbine is a fixed value to be set in a recording device, such as a memory, in such a manner as to vary with the gear-shifting step (because a gear ratio varies with the gear-shifting step).

First, a configuration of a gear-shifting control system in response to a change of a driving mode according to an embodiment of the present disclosure is described with reference to the accompanying drawings.

FIG. 1 is a schematic view illustrating a configuration of an automatic transmission vehicle including the gear-shifting control system responding to the change of the driving mode according to the embodiment of the present disclosure.

With reference to FIG. 1, a gear-shifting control system 1 responding to the change of the driving mode according to the embodiment of the present disclosure includes a mode change switch 10 for the change of the driving mode and an accelerator position sensor (APS) 20 detecting operation of an acceleration pedal by a driver and outputting a corresponding signal. In addition, the gear-shifting control system 1 includes a vehicle speed detector 30 detecting the speed of the output shaft of the transmission, that is, the vehicle speed, and a transmission control unit (TCU) 40.

The mode change switch 10 may be mounted preferably in the vicinity of a driver seat and may be configured in such a manner that a driving mode desired to be entered, for example, one of an ECO mode, a normal mode, a comport mode, and a sports mode is selected using a button or dial input method. The transmission control unit 40 controls a transmission on the basis of information provided from the mode change switch 10, the APS 20, and the vehicle speed detector 30.

According to the embodiment, particularly, when the change of the driving mode to the sports mode is detected while driving in a driving mode other than the sports mode, for example, the ECO mode, the normal mode, or the comport mode, the transmission control unit 40 performs down-shifting to a low-level gear-shifting step that is one step lower than a setting gear-shifting step determined through a sports mode-dedicated gear-shifting pattern (a sports mode-dedicated gear-shifting map) according to a current output of the APS and a current vehicle speed. Thus, the driver can enjoy more dynamic driving and can feel increased vehicle responsiveness.

To this end, the transmission control unit 40 used according to the present disclosure includes a plurality of processors. The plurality of processors are programmed in such a manner as to execute a control sequence in a stepwise manner. When the change of the driving mode to the sports mode is detected while driving in a driving mode other than the sports mode, the sequence of commands is executed to perform the forced down-shifting to a low-level gear-shifting step that is one step lower than the setting gear-shifting step determined through the sports mode-dedicated gear-shifting pattern.

The plurality of processors included in the transmission control unit 40, which are programmed in such a manner as to execute the control sequence in a stepwise manner, include a gear-shifting mode change recognition unit 400 and a number of low-level gear-shifting steps determination unit 410. In addition, the plurality of processors include a turbine expected-speed computation unit 420, a target gear-shifting step determination unit 430, and a transmission controller 440. In addition, the plurality of processors may further include a control time comparison unit 450 and a gear-shifting prevention request unit 460.

The gear-shifting mode change recognition unit 400 receives information on driving mode change from the mode change switch 10 and fetches a gear-shifting pattern matched with a driving mode, a change to which takes place. Then, when the gear-shifting mode change recognition unit 400 recognizes a change of the driving mode to the sports mode during traveling, the number of low-level gear-shifting steps determination unit 410 determines a maximum number of allowable low-level gear-shifting steps according to a result of determining a state of the transmission on the basis of information on the acceleration pedal operation (a signal of the APS 20)

Specifically, at a point in time when a request for the change of the driving mode to the sports mode is detected, if an output of the APS 20 is at or above a setting value (if the condition the output of the APS 20 the setting value is satisfied, that is, if a state where an acceleration pedal is pressed is entered), the number of low-level gear-shifting steps determination unit 410 determines that the transmission is in a powered-on state. Then, the number of lower-level gear-shifting steps that are lower than the setting gear-shifting step determined through the sports mode-dedicated gear-shifting pattern is determined as the maximum number of allowable low-level gear-shifting steps.

For example, in a state where the transmission is powered on and where the output of the APS 20 responding to the acceleration pedal operation is thus at or above the setting value, when the setting gear-shifting step determined through the sports mode-dedicated gear-shifting pattern is the fifth step at the point in time when the request for the change of the driving mode to the sports mode is detected, the total number of lower-level gear-shifting steps that are lower than the fifth step is 4 (the fourth step, the third step, the second step, and the first step). Therefore, in this case, the number of low-level gear-shifting steps determination unit 410 determines that the maximum number of allowable low-level gear-shifting steps is set to 4, and thus sets all the gear-shifting steps lower than the fifth step to be included in a target gear-shifting step list.

Conversely, in a case where the output of the APS 20 is below the setting value at the point in time when the request for the change of the driving mode to the sports mode is detected, the number of low-level gear-shifting steps determination unit 410 determines that the transmission is in a powered-off state. At the same time, the number of low-level gear-shifting steps determination unit 410 determines that the maximum number of allowable low-level gear-shifting steps is set to 1, in such a manner as to allow for down shifting to only the gear-shifting step (a setting gear-shifting step number minus 1) that is one step lower than the setting gear-shifting step determined through the sports mode-dedicated gear-shifting pattern.

For example, in a state where the transmission is powered-off and where the output of the APS 20 responding to the acceleration pedal operation is thus below the setting value, when the setting gear-shifting step determined through the sports mode-dedicated gear-shifting pattern is the fifth step, as in the above-mentioned example, at the point in time when the request for the change to the sports mode is detected, the maximum number of allowable low-level gear-shifting steps is 1. Thus, the down-shifting to the fourth step that is one step lower than the fifth step is set to allowed. The down-shifting of the gear to the gear-shifting step below, that is, to the third or lower gear-shifting step, is set to be constricted. This information on the maximum number of allowable low-level gear-shifting steps is provided to the turbine expected-speed computation unit 420. The turbine expected-speed computation unit 420 computes an immediate post-gear-shifting expected speed of the turbine (the speed of the input shaft of the transmission) for each step that is included within the maximum number of allowable low-level gear-shifting steps, on the basis of the provided information (the information on the maximum allowable low-level gear-shifting step number), using a current speed of the output shaft of the transmission and a gear ratio of each step.

Preferably, as described above, the immediate post-gear-shifting speed of the turbine for each step is derived through simple computation in which the current speed of the output shaft of the transmission (the vehicle speed) is multiplied by the reciprocal of the gear ratio of each step that is included in the maximum number of allowable low-level gear-shifting steps. That is, the immediate post-gear-shifting expected speed of the turbine is at a value (the current speed of the output shaft of the transmission/the gear ratio of each step) that results from dividing the current speed of the output shaft of the transmission (the vehicle speed) by the gear ratio of each step.

Information on the immediate post-gear-shifting expected speed of the turbine for each step that is included within the maximum number of allowable low-level gear-shifting steps is provided to the target gear-shifting step determination unit 430. The target gear-shifting step determination unit 430 compares the computed expected speed of the turbine for each step that is included within the maximum number of allowable low-level gear-shifting steps and a preset allowable speed of the turbine for each step with each other. The target gear-shifting step determination unit 430 sets the lowest-level gear-shifting step, among gear-shifting steps satisfying a predetermined condition, to be a final target gear-shifting step.

The predetermined condition here may be a condition that the immediate post-gear-shifting expected speed of the turbine for each step does not exceed the corresponding allowable speed of the turbine for each step. As described above, the allowable speed of the turbine refers to a maximum value of a rotational speed of the turbine at which the motive power of the engine can be stably output by gear shifting without sacrificing load-bearing capacity. Therefore, when the speed of the turbine that results immediately after gear-shifting (the down-shifting) to a low-level gear-shifting step is performed is higher than the corresponding allowable speed of the turbine, a heavy load is placed on the transmission.

FIG. 2 is a table necessary to describe a process of setting a target gear-shifting step. FIG. 2 illustrates an example where, in a state where the transmission is powered-on (the output of the APS 20 the setting value), the setting gear-shifting step determined through the sports mode-dedicated gear-shifting pattern is the fifth step at the point in time when the request for the change of the driving mode to the sports mode is detected and where the current speed of the output shaft of the transmission is 2000 rpm.

As in FIG. 2, in the state where the transmission is powered on (the output of the APS 20 the setting value), the preset gear-shifting step determined through the sports mode-dedicated gear-shifting pattern is the fifth step at the point in time when the request for the change of the driving mode to the sports mode is detected, when setting the target gear-shifting step, the target gear-shifting step determination unit 430 gives the highest priority to the first step that is the lowest gear-shifting step among the low-level gear-shifting steps lower than the fifth step. However, when the current speed of the output shaft of the transmission serves as a reference, the first step does not satisfy the above-mentioned condition because the expected speed of the turbine exceeds the allowable speed of the turbine.

In contrast, the second step immediately higher than the first step satisfies the condition that the expected speed of the turbine does not exceed the allowable speed of the turbine (the expected speed of the turbine<the allowable speed of the turbine). Therefore, in this case, the target gear-shifting step determination unit 430 excludes the first step, as the lowest-level gear-shifting step, that does not satisfy the above-mentioned condition, from the setting of the target gear-shifting step, and sets the second step that is the lowest-level gear-shifting step, among gear-shifting steps satisfying the above-mentioned condition, to be the final target gear-shifting step.

When the final target gear-shifting step is determined through this process, the transmission controller 440 executes gear-shifting control for shifting the gear-shifting step down to the final target gear-shifting step. For example, in the case of the situation as in FIG. 2, the transmission controller 440 performs the gear-shifting control (controls a corresponding gear-shifting actuator) for shifting the gear-shifting step from the fifth step to the second step.

While the transmission controller 440 performs the gear-shifting control, the control time comparison unit 450 performs the following operation: counting the time (a gear-shifting control time) taken for the gear-shifting control for shifting a current gear-shifting step down to the target gear-shifting step (for example, the down-shifting from the fifth step to the second step); and comparing the counted gear-shifting control time with a preset setting gear-shifting control time.

In a case where the gear-shifting control time (the time taken to shift a current gear-shift step down to the target gear-shifting step) reaches the setting gear-shifting control time that is at a setting input value but the gear-shifting control is not yet completed, the control time comparison unit 450 determines that an appropriate gear-shifting time is exceeded, and makes a request to the transmission controller 440 for preventing of the gear-shifting control.

When along with a change to the sports mode, the forced down-shifting is completed through the processing sequence as described above, there is a need to maintain such a down-shifted state for a predetermined time for the driver to experience a sufficient feeling of acceleration. To this end, the gear-shifting prevention request unit 460 makes a request to the transmission controller 440 for preventing of the gear shifting to the high-level gear-shifting level in order to constrict up-shifting after the gear shifting is completed.

A process of controlling the gear shifting in response to the change of the driving mode will be described in detail below to provide an understanding of the request for the preventing of the gear shifting to the high-level gear-shifting step and the cancellation of the request therefore that are performed in cooperation with the gear-shifting prevention request unit 460 and the transmission controller 440.

Figure 3:
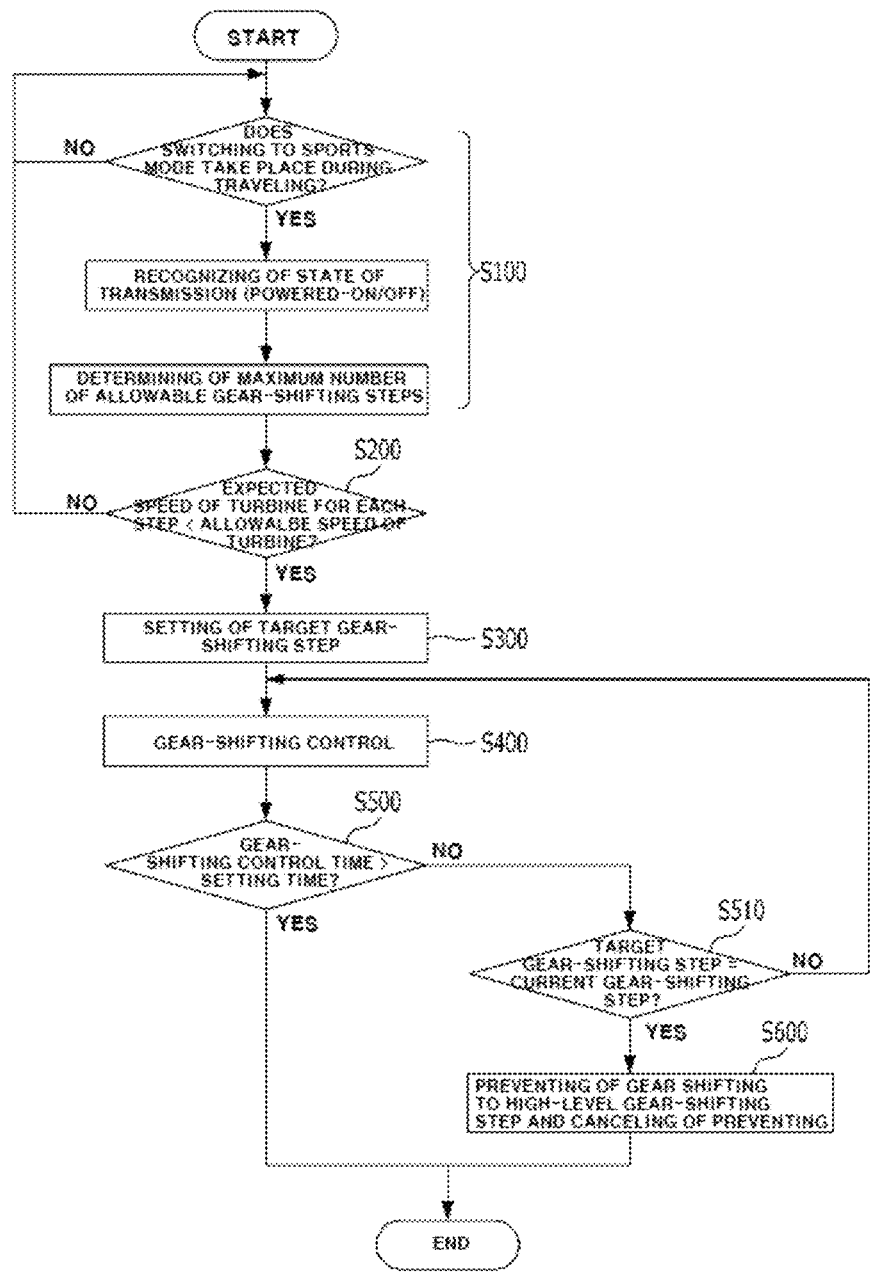
FIG. 3 is a flowchart illustrating sequentially gear-shifting control processes in a sequence that are performed by the gear-shifting control system in FIG. 1.

FIG. 3 is a flowchart illustrating sequentially gear-shifting control processes in a sequence that are performed by the gear-shifting control system in FIG. 1.

With reference to FIG. 3, the method of controlling gear shifting in response to a change of a driving mode according to an embodiment of the present disclosure is a method of controlling a transmission in a case where switching from a driving mode other than a sports mode to the sports mode takes place during the traveling. The method starts with Step S100 of determining a maximum number of allowable low-level gear-shifting steps according to a result of determining a state of a transmission on the basis of information on an acceleration pedal operation (a signal of an APS) when a request for a change of the driving mode to the sports mode is detected during travelling.

In Step S100, specifically, when an output of the APS is at or above a setting value at a point in time when the request for the change of the driving mode is detected (in a state where an acceleration pedal is kept pressed to a preset level or higher), it is determined that the transmission is in a powered-on state. Then, the number of low-level gear-shifting steps lower than a current gear-shifting step that is set according to a sports mode-dedicated gear-shifting pattern is determined as the maximum number of allowable low-level gear-shifting steps.

For example, in a state where the transmission is powered on and where the output of the APS responding to the acceleration pedal operation is thus at or above the setting value, when a setting gear-shifting step determined through a sports mode-dedicated gear-shifting pattern is the fifth step at the point in time when the request for the change of the driving mode to the sports mode is detected, the total number of lower-level gear-shifting steps that are lower than the fifth step is 4 (the fourth step, the third step, the second step, and the first step). Therefore, in this case, the maximum number of allowable low-level gear-shifting steps is set to 4, and thus all the gear-shifting steps lower than the fifth step are set to be included in a target gear-shifting step list.

Conversely, when the output of the APS is below the setting value (in a state where the acceleration pedal is kept depressed or is kept pressed to less than the setting level), the transmission is determined as being in a powered-off state. Then, the maximum number of allowable low-level gear-shifting steps is determined as 1 in such a manner as to allow for down-shifting to only a gear-shifting step (a setting gear-shifting step number minus 1) that is one step lower than the setting gear-shifting step determined through the sports mode-dedicated gear-shifting pattern.

For example, in a state where the transmission is powered off and where the output of the APS responding to the acceleration pedal operation is thus below the setting value, when the setting gear-shifting step determined through the sports mode-dedicated gear-shifting pattern is the fifth step at the point in time when the request for the change of the driving move to the sports mode is detected, the maximum number of allowable low-level gear-shifting steps is 1. Thus, the down-shifting to the fourth step that is one step lower than the fifth step is set to be allowed. The downing-shifting to the gear-shifting step below, that is, to the third or lower gear-shifting step, is set to be constricted.

When the maximum number of allowable low-level gear-shifting steps is determined through Step S100, Step S200 is subsequently performed. In Step S200, the expected speed of the turbine for each step that is included within the maximum number of allowable low-level gear-shifting steps is computed using a current speed of an output shaft of the transmission and a gear ratio of each step, and the computed expected speed of the turbine (an expected speed of an input shaft of the transmission) is compared with a preset allowable speed of the turbine for each step.

In Step S200, preferably, the immediate post-gear-shifting expected speed of the turbine for each step is derived through simple computation in which a current speed of the output shaft of the transmission (a vehicle speed) is multiplied by the reciprocal of the gear ratio of each step that is included in the maximum number of allowable low-level gear-shifting steps. That is, the immediate post-gear-shifting expected speed of the turbine is at a value (the current speed of the output shaft of the transmission/the gear ratio of each step) that results from dividing the current speed of the output shaft of the transmission (the vehicle speed) by the gear ratio of each step.

Subsequently, Step S300 is performed when the expected speed of the turbine for each step that is included in the maximum number of allowable low-level gear-shifting steps is derived from the current speed of the output shaft of the transmission (the vehicle speed). In Step S300, the lowest-level gear-shifting step, among gear-shifting steps at which the expected speed of the turbine and the allowable speed of the turbine satisfy a predetermined condition, is set to be the target gear-shifting step, within the maximum number of allowable low-level gear-shifting steps. The predetermined condition here is a condition that the expected speed of the turbine does not exceed the allowable speed of the turbine.

When the target gear-shifting step is finally determined through Step S300, Step S400 of executing the gear-shifting control for shifting the gear-shifting step down to the target gear-shifting step is performed. Subsequently, Step S500 of comparing the time (a gear-shifting control time) taken for the gear-shifting control for shifting the current gear-shifting step to the target gear-shifting step with a preset setting gear-shifting control time.

In Step S500, specifically, while the above-described transmission controller performs the gear-shifting control, the following operation is performed: counting the time (the gear-shifting control time) taken for the gear-shifting control for shifting a gear-shifting step down to the target gear-shifting step (for example, the down-shifting from the fifth step to the second step); and comparing the counted time for the gear-shifting control with the preset setting gear-shifting control time.

In a case where the gear-shifting control time (the time taken to shift a gear-shift step down to the target gear-shifting step) reaches the setting gear-shifting control time that is a setting input value but the gear-shifting control is not yet completed, an appropriate gear-shifting time that is set is exceeded. Therefore, in such a state, the process is ended without further executing the gear-shifting control. When the setting gear-shifting control time is not exceeded, using the target gear-shifting step, whether or not the gear shifting is completed is monitored (S510).

At this point, in a case where the gear-shifting control time is equal to or shorter than the setting gear-shifting control time and where the gear shifting to the target gear-shifting step is not completed, the process may be set in such a manner that returning to Step S400 takes place and that Step S400 and steps subsequent thereto are repeatedly performed.

When along with a change to the sports mode, the forced down-shifting is completed through the processing sequence as described above, there is a need to maintain such a down-shifted state for a predetermined time for a driver to experience a sufficient feeling of acceleration. To this end, control for completing the gear-shifting and at the same time, constricting the gear shifting toward the high-level gear-shifting step is performed (S600). Preferably, control for constricting up-lifting is executed until a predetermined required condition described below is satisfied.

The control for constricting the up-shifting will be described in more detail below.

Figure 4:
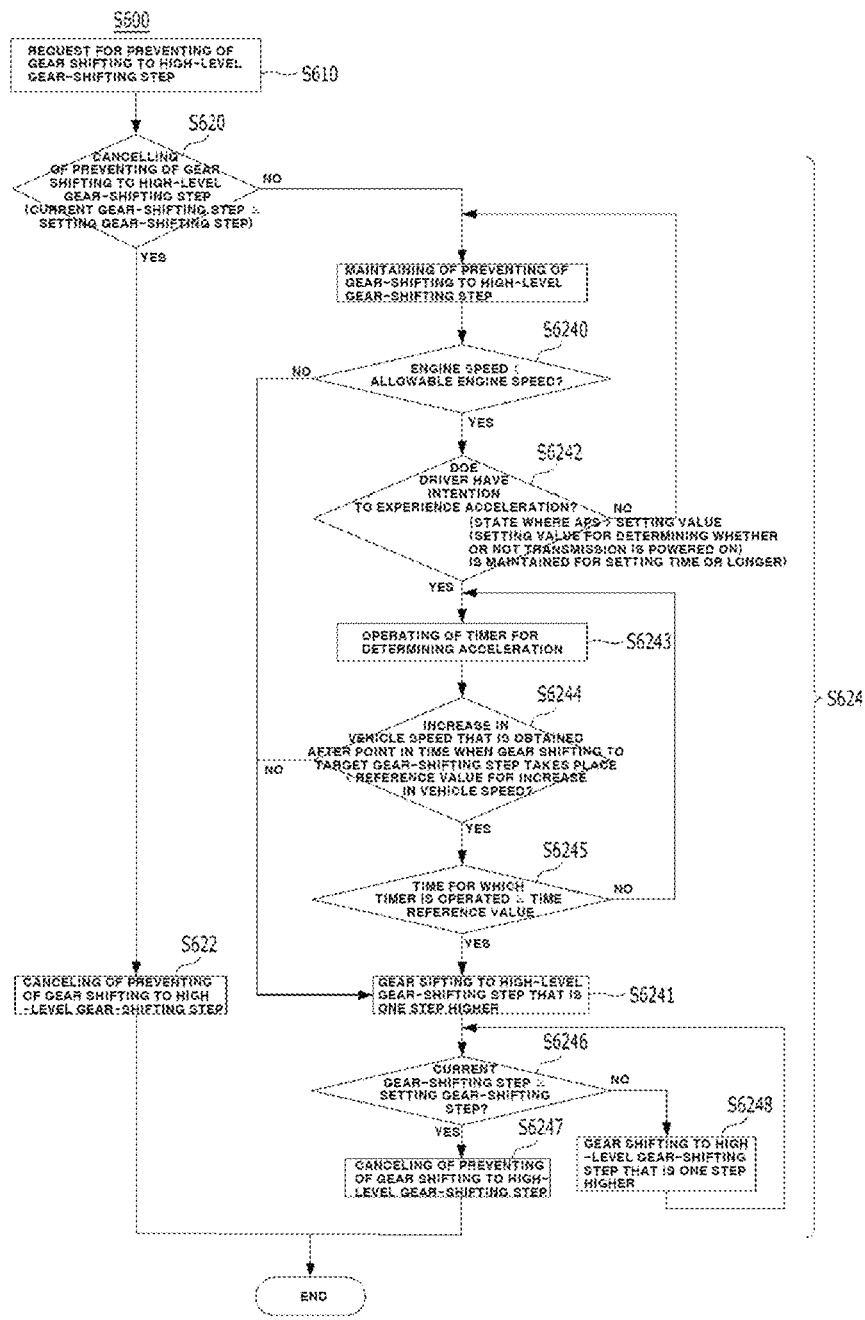
FIG. 4 is a flowchart for control for preventing of up-shifting to a high-level gear-shifting step, the control being performed immediately after down-shifting is performed in response to a change of the driving mode to a sports mode during traveling.

FIG. 4 is a flowchart for control for preventing of the up-shifting to the high-level gear-shifting step, the control being performed immediately after the down-shifting is performed in response to the change of the driving mode to the sports mode during traveling.

With reference to FIG. 4, Step S600 broadly includes Step S610 and Step S620. In Step S610, a request is made for the preventing of the gear shifting in order to constrict the gear shifting toward the high-level gear-shifting step after the gear shifting is completed. In Step S620, after the gear shifting is completed, a current gear-shifting step (the gear-shifting step corresponding to the target gear-shifting step) is compared with the setting gear-shifting step determined through the sports mode-dedicated gear-shifting pattern according to a current output of the APS and the vehicle speed, and, according to a result of the comparison, it is determined whether the preventing of the gear shifting to the high-level gear-shifting step is canceled or maintained.

Specifically, as a result of the comparison through Step S620, when a current gear-shifting step is equal to the setting gear-shifting step or is the high-level gear-shifting step, the control for the preventing of the gear shifting to the high-level gear-shifting step is necessary (S622). When the current gear-shifting step is the gear-shifting step lower than the setting gear-shifting step, by maintaining the preventing of the gear shifting to the high-level gear-shifting step and utilizing additional information, a point in time when the preventing of the gear shifting to the high-level gear-shifting step is cancelled is determined (S624).

When Step S624 is entered, first, a current engine speed is compared with a preset allowable engine speed in order to prevent engine overrun (S6240). As a result, when the current engine speed is higher than the allowable engine speed, forced gear shifting to a high-level gear-shifting step that is one step higher than the current gear-shifting step (the gear-shifting step corresponding to the target gear-shifting step) is performed (S6241). Then, the resulting high-level gear-shifting step is compared with the setting gear-shifting step determined through the sports mode-dedicated gear-shifting pattern according to the output of the APS and the vehicle speed (S6246).

As a result (a result of the comparison through Step S6246), when the high-level gear-shifting step that is one step higher is equal to or higher than the setting gear-shifting step, the preventing of the gear shifting to the high-level gear-shifting step is immediately cancelled (S6247). When the high-level gear-shifting step that is one step higher is the low-level gear-shifting step that is still lower than the setting gear-shifting step, the forced gear shifting to a gear shifting step that is one step higher is further performed (S6248). Then, returning to Step S6246 of comparing the resulting high-level gear-shifting step with the setting gear-shifting step takes place, and then Step S6246 and subsequent steps thereto are repeatedly performed.

Conversely, when the result of the comparison through Step S6240 is that the current engine speed is lower than the allowable engine speed, on the basis of the output of the APS and information on the time for which the output thereof continues to be provided, it is determined whether or not the driver has the intention to experience acceleration (S6242) In Step S6242, preferably, when the output of the APS continues to be provided in a state of being at or above the setting value (the setting value used to determine whether or not the transmission is powered on) for a preset time or longer, it is determined that the driver actually has the intention to experience acceleration.

When it is determined in Step S6242 that the driver actually has the intention to experience acceleration (when the output of the APS continues to be provided in the state of being at or above the setting value (the setting value used to determine whether or not the transmission is powered on) for the preset time), a timer (a timer for determining acceleration) is operated (S6243), and, at the same time, an increase in the vehicle speed that is obtained after a point in time when the gear shifting to a current gear-shifting step is completed is compared with a preset reference value for the increase in the vehicle speed (S6244).

At this point, when the increase in the vehicle speed is at or above the reference value for the increase in the vehicle speed, this situation is recognized as an increase in the vehicle speed due to a slope of a road, rather than the driver's intention to experience acceleration. Thus, the process immediately switches to Step S6241. When the increase in the vehicle speed is below the reference value for the increase in the vehicle speed, a value of the time for which the timer is operated is compared with a preset time reference value (S6245). Then, at a point in time when the value of the time is higher than the preset time reference value, the process switches to above-described Step S6241.

In the related art, in a case where switching from a driving mode other than the sports mode to the sports mode takes place during the traveling, the gear shifting is performed uniformly in accordance with a gear-shifting reference point that is determined in the sports mode-dedicated gear-shifting pattern according to a current vehicle state (the vehicle speed and an amount of work on a pedal). Thus, there is a disadvantage in that the driver's desire to enjoy dynamic driving is not satisfied.

In contrast, according to the embodiment of the present disclosure, when the switching from a driving mode other than the sports mode to the sports mode takes place during the traveling, the target gear-shifting step is set to be a low-level step lower than the gear-shifting step that is set in the sports mode-dedicated gear-shifting pattern (a gear-shifting map) (the gear-shifting up to the lowest-level gear-shifting step is allowed on the basis of the allowable speed of the turbine for each step). Accordingly, the down-shifting is performed in a wider range. Thus, the driver's desire to enjoy dynamic driving can be satisfied.

Only the preferred embodiment of the present disclosure are described above. However, the present disclosure should be understood as not being limited to the preferred embodiment. All modifications, equivalents, substitutions that do not depart from the and gist of the present disclosure should be understood as falling within the scope of the present disclosure that is defined in the following claims.

What is claimed is:

1. A method of controlling gear shifting in response to a change of a driving mode, the method comprising:
    (a) determining a maximum number of allowable low-level gear-shifting steps according to a result of determining a state of a transmission on the basis of information on an acceleration pedal operation (a signal of an APS) when a request for a change of a driving mode to a sports mode is detected during traveling;
    (b) computing an immediate post-gear-shifting expected speed of a turbine for each step that is included within the maximum number of allowable low-level gear-shifting steps, using a current speed of an output shaft of the transmission and a gear ratio of each step and comparing the computed expected speed of the turbine (a speed of an input shaft of the transmission) with a preset allowable speed of the turbine for each step;

(c) setting the lowest-level gear-shifting step, among gear-shifting steps at which the expected speed of the turbine and the allowable speed of the turbine satisfy a predetermined condition, is set to be a target gear-shifting step, within the maximum number of allowable low-level gear-shifting steps; and (d) executing gear-shifting control for shifting a current gear-shifting step down to the target gear-shifting step.

2. The method of claim 1, wherein in (a) the determining of the maximum number of allowable low-level gear-shifting steps, when an output of an APS is at or above a setting value at a point in time when the request for the change of the driving mode is detected, it is determined that the transmission is in a powered-on state, and when the output of the APS is below the setting value, it is determined that the transmission is in a powered-off state.

3. The method of claim 2, wherein when the transmission is in the powered-on state, the number of low-level gear-shifting steps that are lower than a setting gear-shifting step determined through a sports mode-dedicated gear-shifting pattern is determined as the maximum number of allowable low-level gear-shifting steps, and when the transmission is in the powered-off state, the maximum number of allowable low-level gear-shifting steps is determined as 1 in such a manner as to allow for low-level gear shifting to only a low-level gear-shifting step (a setting gear-shifting step number minus 1) that is one step lower than the setting gear-shifting step determined through the sports mode-dedicated gear-shifting pattern.

4. The method of claim 1, wherein in (b) the computing of the immediate post-gear-shifting expected speed of the turbine, the immediate post-gear-shifting expected speed of the turbine for each step is at a value (the current speed of the output shaft of the transmission/the gear ratio of each step) that results from dividing the current speed of the output shaft of the transmission by the gear ratio of each step.

5. The method of claim 1, wherein in (c) the setting of the lowest-level gear-shifting step, the predetermined condition is that the expected speed of the turbine does not exceed the allowable speed of the turbine.

6. The method of claim 1, further comprising:

(e) comparing the time (a gear-shifting control time) taken for the gear-shifting control for shifting the current gear-shifting step down to the target gear-shifting step in (d) the executing of the gear-shifting control, with a preset setting gear-shifting control time, wherein when the gear-shifting control time exceeds the setting gear-shifting control time, a process is ended in such a state without further executing the gear-shifting control, and wherein when the gear-shifting control time is shorter than the setting gear-shifting control time, it is determined whether or not gear shifting to the target gear-shifting step is completed, and when the gear shifting is completed within the setting gear-shifting control time, the process is ended.

7. The method of claim 6, wherein in a case where the gear-shifting control time is shorter than the setting gear-shifting control time and where the gear shifting to the target gear-shifting step is not completed, returning to (d) the executing of the gear-shifting control, and (d) the executing of the gear-shifting control and (e) the comparing of the time taken for the gear-shifting control are repeatedly performed.

8. The method of claim 6, further comprising:

(f) executing control for constricting gear shifting toward a high-level gear-shifting step after the gear shifting to the target gear-shifting step is completed.

9. The method of claim 8, wherein (f) the executing of the control for constricting the gear shifting comprises:

(f-1) making a request for preventing of the gear shifting to the high-level gear-shifting step in order to constrict the gear shifting to the high-level gear-shifting step after the gear shifting to the target gear-shifting step is completed; and (f-2) comparing the current gear-shifting step (a gear-shifting step corresponding to the target gear-shifting step) with a setting gear-shifting step determined through a sports mode-dedicated gear-shifting pattern according to a current output of an APS and a current vehicle speed and determining according to a result of the comparison whether the preventing of the gear shifting to the high-level gear-shifting step is canceled or maintained.

10. The method of claim 9, wherein (f-2) the comparing of the current gear-shifting step with the setting gear-shifting step comprises:

(f-2-1) canceling immediately the preventing of the gear shifting to the high-level gear-shifting step because control for the preventing of the gear shifting to the high-level gear-shifting step is unnecessary when the current gear-shifting step (the gear-shifting step corresponding to the target gear-shifting step) is equal to the setting gear-shifting step or is the high-level gear-shifting step; and (f-2-2) maintaining the preventing of the gear shifting to the high-level gear-shifting step when the current gear-shifting step (the gear shifting step corresponding to the target gear-shifting step) is a gear-shifting step lower than the setting gear-shifting step, and determining a point in time when the preventing of the gear shifting to the high-level gear-shifting step is canceled, by utilizing additional information.

11. The method of claim 10, wherein in (f-2-2) the maintaining of the preventing of the gear shifting, a current engine speed is compared with a preset allowable engine speed in order to prevent engine overrun, when the current engine speed is higher than the allowable engine speed, forced gear shifting to a high-level gear-shifting step that is one step higher than the current gear-shifting step (the gear-shifting step corresponding to the target gear-shifting step) is performed and then the resulting high-level gear-shifting step is compared with the setting gear-shifting step determined through the sports mode-dedicated gear-shifting pattern according to the current output of the APS and the current vehicle speed, and when the high-level gear-shifting step that is one step higher is higher than the setting gear-shifting step, the preventing of the gear shifting to the high-level gear-shifting step is canceled.

12. The method of claim 11, wherein when the current engine speed is lower than the allowable engine speed, on the basis of an output of the APS and the time for which the output thereof continues to be provided, it is determined whether or not a driver has the intention to experience acceleration, wherein when the output of the APS continues to be provided in a state of being at or above a setting value for a setting time or longer, it is determined that the driver actually has the intention to experience acceleration, thus a timer is operated and, at the same time, an increase in the vehicle speed that is obtained after a point in time when the gear shifting to the current gear-shifting step is completed is compared with a preset reference value for the increase in the vehicle speed, wherein when the increase in the vehicle speed is at or above the reference value for the increase in the vehicle speed, this situation is recognized as an increase in the vehicle speed due to a slope of a road, rather than the intention to experience acceleration, and thus the forced gear shifting to the high-level gear-shifting step that is one step higher than the current gear-shifting step (the target gear-shifting step) is immediately performed, and wherein thereafter, the resulting high-level gear-shifting step is compared with the setting gear-shifting step determined through the sports mode-dedicated gear-shifting pattern according to the current output of the APS and the current vehicle speed, and when the high-level gear-shifting step that is one step higher is higher than the setting gear-shifting step, the preventing of the gear-shifting to the high-level gear-shifting step is canceled.

13. The method of claim 12, wherein as a result of comparing the increase in the vehicle speed that is obtained after the point in time when the gear shifting is completed with the reference value for the increase in the vehicle speed, when the increase in the vehicle speed is below the reference value for the increase in the vehicle speed, a value of the time for which the timer is operated is compared with a preset time reference value, and at a point in time when the time value is higher than the time reference value, the forced gear shifting to the high-level gear-shifting step that is one step higher than the current gear-shifting step is performed, and wherein thereafter, the resulting high-level gear-shifting step is compared with the setting gear-shifting step determined through the sports mode-dedicated gear-shifting pattern according to the current output of the APS and the current vehicle speed, and when the high-level gear-shifting step that is one step higher is higher than the setting gear-shifting step, the preventing of the gear shifting to the high-level gear-shifting step is canceled.

14. The method of claim 11, wherein the forced gear shifting to the high-level gear-shifting step that is one step higher than the current gear-shifting step (the gear-shifting step corresponding to the target gear-shifting step) is performed, and then the resulting high-level gear-shifting step is compared with the setting gear-shifting step determined through the sports mode-dedicated gear-shifting pattern according to the current output of the APS and the current vehicle speed, wherein as a result of the comparison, when the high-level gear-shifting level that is one step higher is lower than the setting gear-shifting step, forced gear shifting to a high-level gear-shifting step that is one step higher is performed, and wherein thereafter, returning to the comparing of the resulting high-level gear-shifting step with the setting gear-shifting step takes place, and the comparing of the resulting high-level gear-shifting step and an operation subsequent thereto are repeatedly performed.

15. A system for controlling gear shifting in response to a change of a driving mode, the system comprising:
a mode change switch for a change of a driving mode;
an accelerator position sensor (APS) configured to detect operation of an accelerator pedal by a driver and to output a corresponding signal;
a vehicle speed detector configured to detect a speed of an output shaft of a transmission; and
a transmission control unit (TCU) configured to control the transmission on the basis of information provided from the mode change switch, the APS, and the vehicle speed detector,
wherein when a change from a driving mode other than a sports mode to the sports mode is detected during traveling, the transmission control unit executes control for down-shifting to a low-level gear-shifting step that is one step lower than a setting gear-shifting step determined through a sports mode-dedicated gear-shifting pattern.

16. The system of claim 15, wherein the transmission control unit comprises:
a gear-shifting mode change recognition unit configured to receive information on driving mode change from the mode change switch and to fetch a gear-shifting pattern matched with a driving mode, a change to which takes place;
a number of low-level gear-shifting steps determination unit configured to determine a maximum number of allowable low-level gear-shifting steps according to a result of determining a state of the transmission on the basis of information on the acceleration pedal operation (a signal of an APS) when the gear-shifting mode change recognition unit recognizes the change of the driving mode to the sports mode during the traveling;
a turbine expected-speed computation unit configured to compute an immediate post-gear-shifting expected speed of a turbine (a speed of an input shaft of the transmission) for each step that is included within the maximum number of allowable low-level gear-shifting steps, using a current speed of an output shaft of the transmission and a gear ratio of each step;
a target gear-shifting step determination unit configured to set the lowest-level gear-shifting step, among gear-shifting steps at which the computed expected speed of the turbine for each step that is included within the maximum number of allowable low-level gear-shifting steps and a preset allowable speed of the turbine for each step satisfy a predetermined condition, to be a target gear-shifting step;
a transmission controller configured to execute gear-shifting control for shifting a gear-shifting step down to the target gear-shifting step; and
a gear-shifting prevention request unit configured to make a request to the transmission controller for preventing of gear shifting to a high-level gear-shifting step for constricting the gear shifting toward the high-level gear-shifting step after the gear shifting to the target gear-shifting step is completed.

17. The system of claim 16, wherein when an output of the APS is at or above a setting value at a point in time when a request for the change of the driving mode is detected, the number of low-level gear-shifting steps determination unit determines that the transmission is in a powered-on state and determines as the maximum number of allowable low-level gear-shifting steps the number of low-level gear-shifting steps that are lower than the setting gear-shifting step determined through the sports mode-dedicated gear-shifting pattern, and wherein when the output of the APS is below the setting value, the number of low-level gear-shifting steps determination unit determines that the transmission is in a powered-off state, and determines the maximum number of allowable low-level gear-shifting steps as 1 in such a manner as to allow for low-level gear shifting to only the low-level gear-shifting step (a setting gear-shifting step number minus 1) that is one step lower than the setting gear-shifting step determined through the sports mode-dedicated gear-shifting pattern.

18. The system of claim 16, wherein the predetermined condition is a condition that the expected speed of the turbine does not exceed the allowable speed of the turbine.

19. The system of claim 16, wherein the transmission control unit further comprises:

a control time comparison unit configured to count the time (a gear-shifting control time) taken for the gear-shifting control for shifting a current gear-shifting step down to the target gear-shifting step and to compare the counted gear-shifting control time with a preset setting gear-shifting control time, wherein when the gear-shifting control time exceeds the setting gear-shifting control time, the control time comparison unit makes a request to the transmission controller for preventing of the gear-shifting control.

\* \* \* \* \*